United States Patent Office 2,794,516
Patented June 4, 1957

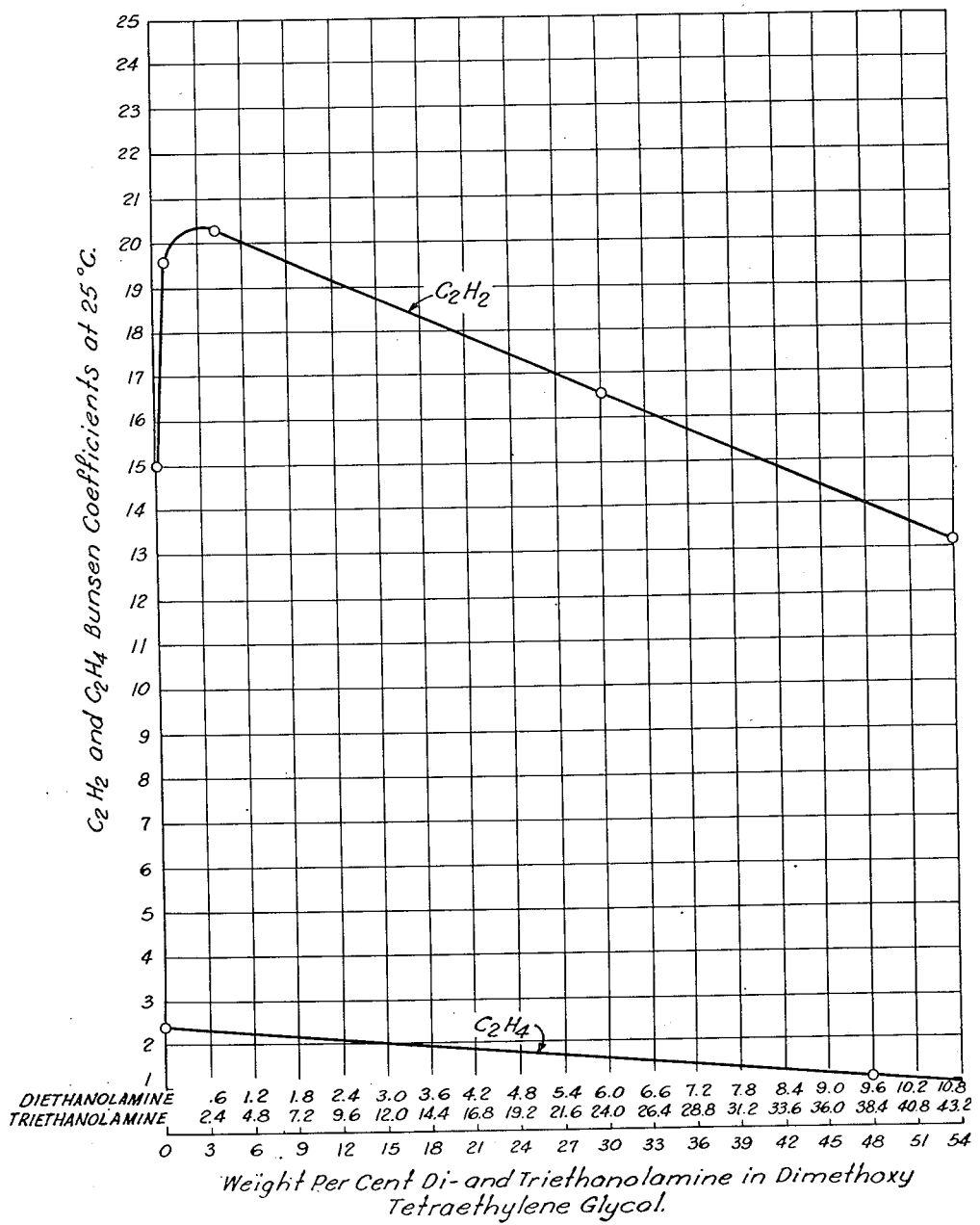

2,794,516
SOLVENT AND PROCESS FOR SEPARATING ACETYLENE FROM GAS MIXTURE

Durward A. Baggett, Galveston, Tex., assignor to The Dow Chemical Company, Midland, Mich., a corporation of Delaware Application October 10, 1955, Serial No. 539,448

14 Claims. (Cl. 183—115)

This invention relates to a process for separating acetylene from a mixture of gases containing the same, and has as its object to provide an improved solvent, and process of employing the same, for selectively absorbing acetylene from such a mixture of gases.

Acetylene may be separated or recovered from a gaseous mixture either to obtain the acetylene in a more purified state, or to purify the gas from which the acetylene is separated. In the cracking of hydrocarbons, a product gas is obtained which consists essentially of ethylene, and which contains small amounts, up to 1% each, of acetylene and $CO_2$. Other gases may also be present, and the amounts of these gases will depend upon the particular cracking process employed. It has been common practice in the past to remove these small amounts of acetylene from ethylene by scrubbing or contacting the gaseous mixture with a selective organic solvent, such as the glycols. The solvent is then stripped or boiled to remove the acetylene, and subsequently recirculated through the scrubbing towers for additional absorption of acetylene.

Choice of a solvent is determined primarily by its selectivity, i. e., the absorption of acetylene in proportion to the amount of other gases absorbed, and its capacity, i. e., the amount of acetylene absorbed by a given volume of solvent. A third factor of extreme practical importance is the cost of the solvent, since large amounts of the solvent must be employed, and losses through evaporation and leakage are inevitable.

It has been found that acetylene can be selectively absorbed from a mixture of gases, and particularly from admixture with ethylene, by contacting or scrubbing the mixture of gases with a solvent, consisting essentially of a glycol ether and an alkanolamine. Quite unexpectedly it has been discovered that the alkanolamine, which is itself a very poor solvent for acetylene, synergistically enhances the acetylene-absorbing characteristics of the glycol ether, while at the same time maintaining the selectivity of this solvent for acetylene.

The ability of a solvent to dissolve a given gas is measured by the Bunsen coefficient. The Bunsen coefficient is the ratio of the volume of gas dissolved to the volume of solvent in which it is dissolved. This is determined by passing the gas to be absorbed through the test solvent until a rise in gas pressure above the solvent indicates the end point of solubility. Since the solubility of any gas in a liquid is directly related to the temperature of the liquid, the temperature is always specified, i. e., Bunsen coefficient at 25° C., and throughout this application all such measurements were made at 25° C. The glycol ethers are well known as acetylene solvents and have relatively high Bunsen coefficients. The alkanolamines, on the other hand, have a very low Bunsen coefficient for acetylene. When added to glycol ethers in small amounts, however, these alkanolamines materially increase the capacity of the glycol ethers for absorbing or dissolving acetylene.

Glycol ethers which have been found satisfactory in the present invention have the formula

$$RO(R_1O)_mR_2$$

wherein R is an alkyl radical containing from 1 to 5 carbon atoms, $R_1$ is an alkylene radical containing from 2 to 4 carbon atoms, and is attached to ether oxygens through vicinal linkages, $m$ is an integer from 1 to 4, and $R_2$ is selected from the group consisting of hydrogen and an alkyl radical containing from 1 to 5 carbon atoms.

$R_1$ is normally ethylene, since ethylene oxide is the most common of these alkylene oxides and produces ethers which are quite satisfactory for the present invention. Nevertheless, both the propylene and butylene oxides may be employed in producing these glycol ethers. It is essential, however, that these alkylene oxides be of the alpha-beta type wherein the ether oxygen is attached to the alkylene radical through vicinal linkages, i. e., adjacent carbon atoms. Thus, trimethylene glycol is a very poor solvent for acetylene and is not operable in the present invention. It is not necessary that all alkylene oxide units in the glycol ether be the same. The definition of $R_1$, as used above and in the claims, includes mixtures of ethylene, propylene and butylene oxide units.

The higher members of the polyglycol series are preferred, such as the triethylene and tetraethylene ethers, although the lower members are operable in the invention.

The size of the terminal alkyl groups, R and $R_2$, is not critical as long as they contain not more than 5 carbon atoms. The methyl radicals are preferred, for example, dimethoxytetraethyleneglycol.

Any alkanolamine can be used wherein each alkanol radical contains at least 2 and not more than 4 carbon atoms. Those amines are preferred, however, wherein all of the substituents on the amine nitrogen are either hydrogen or an alkanol radical, as above defined. The enhancement of the capacity of the glycol ether to absorb acetylene increases with the number of alkanol groups attached to the amine nitrogen. Thus, the di and trialkanolamines are preferred, and the trialkanolamines have exceptionally good properties in this regard. Triethanolamine is the most readily available of such compounds, and has demonstrated exceptional activity in a synergistic enhancement of the acetylene-absorbing characteristics of the glycol ethers. The alkanol groups may be mixed, as in monoethanolmonoisopropanolamine, diethanolmonoisopropanolamine and diisopropanolmonobutanolamine. Other typical alkanolamines which may be employed are:

Monoethanolamine
Diethanolamine
Triethanolamine
Monoisopropanolamine
Diisopropanolamine
Triisopropanolamine
Monobutanolamine
Dibutanolamine
Tributanolamine
Monoethanoldiisopropanolamine
Monoethanolmonobutanolamine
Diethanolmonobutanolamine
Monoisopropanolmonobutanolamine
Monoethanoldibutanolamine
Monoisopropanoldibutanolamine
Monoethanolmonoisopropanolmonobutanolamine
n-Propanolamine
n-Propanolmonoethanolamine
n-Propanolmonoisopropanolamine
n-Propanoldiethanolamine
n-Propanoldiisopropanolamine The synergistic effect of the alkanolamines upon the polyglycol ethers is most marked when very small amounts of the alkanolamine, that is up to 3% by weight of the total solvent, are added to the glycol ether. A significant increase is apparent at as little as 0.5% by weight of amine. There is an improvement noted with most combinations, however, up to and above 10% by weight of alkanolamine. With triethanolamine, for example, the acetylene-absorbing characteristics are improved when as much as 30% by weight of the amine is added to the glycol ether. Nevertheless, the optimum acetylene-absorbing characteristics are usually obtained in amounts not greater than 5% by weight of alkanolamine.

Other constituents than the glycol ether and alkanolamine may be present in the solvent. For example, water may be added in order to promote solubility of the alkanolamine in the glycol ether. Preferably the amount of water should be kept as low as possible, for example, below 4%.

The following examples are set forth in order to disclose the present invention with greater particularity to those skilled in the art.

Example 1

The Bunsen coefficient of varying mixtures of diethanolamine and triethanolamine was determined both for acetylene and ethylene, and the results have been plotted in the graph forming the figure. It will be noted that a remarkable increase in the capacity of the glycol dimethoxytetraethylene glycol to absorb the acetylene is achieved when as little as 1% (total) of the alkanolamines is added to the ether. This acetylene-absorbing characteristic begins to drop at or around 5%, total alkanolamine addition. Nevertheless, an improvement is noted in the capacity of the glycol ether for absorbing acetylene, even when as much as a total of 30% of these alkanolamines has been added. Although only two points were determined on the ethylene-absorption curve, it is evident that the solvents disclosed in the graph are highly selective regarding their absorption of acetylene as compared with their absorption of ethylene.

Example 2

Although triethanolamine quite frequently occurs in combination with diethanolamine, as is illustrated in Example 1, tests were run on pure triethanolamine to determine what effect the addition of diethanolamine thereto actually had, and the results are set forth in the following table:

| Weight percent Triethanolamine in dimethoxytetraethylene glycol | $C_2H_2$ Bunsen coeff. at 25° C. |
|---|---|
| 0.0 | 16.2 |
| 2.0 | 20.3 |
| 4.2 | 20.3 |
| 8.4 | 19.8 |
| 25.6 | 17.2 |
| 42.2 | 14.9 |
| 52.6 | 13.4 |

Comparing the data in the above table with the figure, it will be noted that the curve for triethanolamine would follow almost exactly that of a triethanol-diethanolamine mixture. Consequently, the addition of diethanolamine in the amounts set forth in the figure have little or no effect on the characteristics of the triethnanolamine by itself.

Example 3

Diethanolamine in varying amounts was added to dimethoxytetraethylene glycol containing 2% water, and the Bunsen coefficient determined at 25° C. for both acetylene and ethylene, the data obtained are set forth in the following table:

| Weight percent Diethanolamine in dimethoxy Tetraethylene glycol (2% water) | $C_2H_2$ Bunsen coeff. at 25° C. | $C_2H_4$ Bunsen coeff. at 25° C. |
|---|---|---|
| 0.0 | 12.7 | 0.8 |
| 0.5 | 13.7 | |
| 1.0 | 14.0 | 0.8 |
| 5.0 | 13.5 | 0.8 |
| 10.0 | 13.1 | 0.8 |

It is at once apparent that diethanolamine does not have a synergistic action to the degree evidenced by the triethanolamine for enhancing the capacity of the glycol ether in absorbing acetylene. Nevertheless, there is a certain amount of synergism and the constant figure for the ethylene absorption indicates the maintenance of good selectivity.

Example 4

The Bunsen coefficient of various mixtures of monoethanolamine with dimethoxytetraethylene glycol were determined and are shown in the following table:

| Weight percent Monoethanolamine in dimethoxytetraethylene glycol | $C_2H_2$ Bunsen coeff. at 25° C. | $C_2H_4$ Bunsen coeff. at 25° C. |
|---|---|---|
| 0.0 | 15.0 | 2.4 |
| 1.0 | 15.5 | 2.0 |
| 2.5 | 16.3 | |
| 5.0 | 16.0 | |
| 6.5 | 15.1 | |
| 10.0 | 15.1 | 1.8 |
| 100.0 | 6.0 | |

Here again it is seen that the lower alkanolamines do not have the same synergistic effect that the higher alkanolamines have in increasing the capacity of the glycol ethers for absorbing acetylene. There is a material enhancement of this property, however, where very small amounts of the alkanolamine are added. It is clear from the above table that the monoethanolamine has very poor absorption qualities itself for acetylene, and this same statement may be made of all the alkanolamines falling within the scope of this invention.

As a specific example of how the present invention may be employed to separate acetylene from mixtures of gases, reference is made to the removal of acetylene from a stream consisting essentially of ethylene, which results from the cracking of hydrocarbons. Although the percentage composition of such gas mixtures may vary widely, the amount of acetylene normally is about 0.7 to 1.0%. Carbon dioxide is usually present also in such gas streams. The extraction or separation process consists essentially in scrubbing the mixed gases with the solvent, whereby the acetylene is preferentially absorbed, separating the enriched solvent from the non-absorbed gas, and thereafter treating the enriched solvent to recover the acetylene therefrom. The initial scrubbing step may be carried out in the conventional manner in conventional equipment, e. g., a bubble-cap, or packed absorption tower operating on the countercurrent principle. The operation may be carried out at atmospheric, sub-atmospheric, or super-atmospheric pressure. The solution of acetylene and the solvents of the present invention closely follows Henry's law in that the weight of acetylene dissolved by a given weight of solvent increases substantially linearly with the partial pressure of the acetylene. Since the solubility of the acetylene varies indirectly with the temperature, the absorption or scrubbing operation is advantageously carried out at as low a temperature as can conveniently or economically be maintained. When the present invention is applied to the recovery of acetylene from the effluent gas of a high temperature hydrocarbon cracking or partial oxidation process, such gas is preferably first cooled to a temperature below 100° C. to condense out the water vapor, after which it is passed to the absorption or scrubbing step with the present process with or without compression. The absorption of the acetylene from the enriched solvent may likewise be effected in any of the conventional ways employing conventional equipment. The desorption operation is the reverse of that carried out in the absorption or scrubbing step, and is favored by elevated temperature and/or low partial pressures of acetylene. Preferably, both of these factors are combined, i. e., the enriched solvent is heated under partial vacuum until substantially all of the acetylene is driven off. Alternatively, it may be gas stripped at ordinary or elevated temperatures. Inasmuch as the solvents comprising the present invention may be employed in the same manner as those of the prior art, details of this process need not be set forth since they are well known to those skilled in the art and do not form the basis for the present invention.

From the above description of the invention, it is apparent that the present invention resides in a new and improved solvent for separating acetylene from gases with which it may be admixed, and the process of using this solvent to effect such separation. Fundamentally, the discovery has been made that the addition of an alkanolamine to a glycol ether materially enhances the acetylene-absorbing characteristics of the glycol ether. The combined ingredients provide a solvent or absorber liquid which is highly selective as regards acetylene, has a relatively high capacity for dissolving acetylene, and is sufficiently low in cost to be commercially practicable.

I claim:

1. A process for separating acetylene from a mixture of gases containing the same, which comprises scrubbing said mixture of gases with an absorbent liquor consisting essentially of a glycol ether having the formula $$RO(R_1O)_mR_2$$

wherein:

R is an alkyl radical containing from 1 to 5 carbon atoms, $R_1$ is an alkylene radical containing from 2 to 4 carbon atoms, and is attached to the ether oxygens through vicinal linkages, $m$ is an integer from 1 to 4, and $R_2$ is selected from the group consisting of hydrogen and an alkyl radical containing from 1 to 5 carbon atoms, and an alkanolamine in which each alkanol radical contains at least 2 and not more than 4 carbon atoms, said amine being present in an amount sufficient to synergistically enhance the acetylene-absorbing characteristics of the glycol ether.

2. The process of claim 1 wherein each of the substituents attached to the amine nitrogen of the alkanolamine is selected from the group consisting of hydrogen and an alkanol radical containing at least 2 and not more than 4 carbon atoms.

3. The process of claim 2 wherein $R_1$ is $C_2H_4$ and the alkanol radical is ethanol.

4. A process for separating acetylene from a mixture of gases containing the same, which comprises contacting said mixture of gases with a solvent consisting essentially of a glycol ether having the formula $$RO(C_2H_4O)_4R_1$$

wherein:

R is an alkyl radical containing from 1 to 5 carbon atoms, and $R_1$ is a member of the group consisting of hydrogen and an alkyl radical containing from 1 to 5 carbon atoms, and up to 10% of alkanolamine in which each substituent on the amine nitrogen is a member of the group consisting of H and $C_2H_4OH$.

5. A process for separating acetylene from a mixture of gases containing the same, which comprises contacting said mixture of gases with a solvent consisting essentially of dimethoxytetraethylene glycol and up to 30% by weight of triethanolamine.

6. A process of separating acetylene from admixture with ethylene, which comprises contacting said gas mixture with a solvent consisting essentially of a glycol ether having the formula $$RO(R_1O)_mR_2$$

wherein:

R is an alkyl radical containing from 1 to 5 carbon atoms, $R_1$ is an alkylene radical containing from 2 to 4 carbon atoms, and is attached to the ether oxygens through vicinal linkages, $m$ is an integer from 1 to 4, and $R_2$ is selected from the group consisting of hydrogen and an alkyl radical containing from 1 to 5 carbon atoms, and up to 10% by weight of an alkanolamine in which each of the substituents attached to the amine nitrogen is selected from the group consisting of hydrogen and an alkanol radical containing at least 2 and not more than 4 carbon atoms.

7. The process of claim 6 wherein $R_1$ is $C_2H_4$ and the alkanol radical is $C_2H_4OH$.

8. A process of separating acetylene from admixture with ethylene which comprises contacting said gas mixture with a solvent consisting essentially of dimethoxytetraethylene glycol and up to 5% by weight of an alkanolamine in which each of substituents attached to the amine nitrogen is a member of the group consisting of hydrogen and an ethanol radical.

9. A solvent for absorbing acetylene from a mixture of gases containing the same, which consists essentially of a glycol ether having the formula $$RO(R_1O)_mR_2$$

wherein:

R is an alkyl radical containing from 1 to 5 carbon atoms, $R_1$ is an alkylene radical containing from 2 to 4 carbon atoms, and is attached to the ether oxygens through vicinal linkages, $m$ is an integer from 1 to 4, and $R_2$ is selected from the group consisting of hydrogen and an alkyl radical containing from 1 to 5 carbon atoms, and an alkanolamine in which each alkanol radical contains at least two and not more than four carbon atoms, said amine being present in an amount sufficient to synergistically enhance the acetylene-absorbing characteristics of the glycol ether.

10. The solvent defined in claim 9 wherein each of the substituents on the amine nitrogen of the alkanolamine is a member of the group consisting of hydrogen and an alkanol radical containing at least 2 and not more than 4 carbon atoms.

11. A solvent for absorbing acetylene from a mixture of gases containing the same, which consists essentially of a glycol ether having the formula $$RO(C_2H_4O)_mR_1$$

wherein:

R is an alkyl radical containing from 1 to 5 carbon atoms, $m$ is an integer from 1 to 4, and $R_1$ is a member of the group consisting of hydrogen and alkyl radical containing from 1 to 5 carbon atoms, and up to 10% by weight of an alkanolamine in which the substituents attached to the amine nitrogen are selected from the group consisting of hydrogen and $C_2H_4OH$.

12. The solvent defined in claim 11 in which $m$ equals 4 and the alkanolamine is present in amounts ranging from 0.5 to 5.0% by weight.

13. A solvent for selectively dissolving acetylene from a gaseous mixture containing the same, which consists essentially of dimethoxytetraethylene glycol and 3.0% by weight of an ethanolamine wherein each substituent on the amine nitrogen is a member of the group consisting of hydrogen and $C_2H_4OH$.

14. The solvent defined in claim 13 in which the ethanolamine is triethanolamine.

References Cited in the file of this patent

Hasche, Abstract, Serial No. 633,843, published February 7, 1950, 631 O. G. 283.